(12) United States Patent
Petersen et al.

(10) Patent No.: US 12,105,291 B2
(45) Date of Patent: Oct. 1, 2024

(54) PROJECTION DEVICE FOR SMART GLASSES, METHOD FOR REPRESENTING IMAGE INFORMATION, USING A PROJECTION DEVICE, AND CONTROL UNIT

(71) Applicant: Robert Bosch GmbH, Stuttgart (DE)

(72) Inventors: Andreas Petersen, Eningen (DE); Gael Pilard, Wankheim (DE); Hendrik Specht, Pliezhausen (DE)

(73) Assignee: ROBERT BOSCH GMBH, Stuttgart (DE)

(*) Notice: Subject to any disclaimer, the term of this patent is extended or adjusted under 35 U.S.C. 154(b) by 154 days.

(21) Appl. No.: 17/796,185

(22) PCT Filed: Feb. 4, 2021

(86) PCT No.: PCT/EP2021/052603
§ 371 (c)(1),
(2) Date: Jul. 28, 2022

(87) PCT Pub. No.: WO2021/185509
PCT Pub. Date: Sep. 23, 2021

(65) Prior Publication Data
US 2023/0071805 A1  Mar. 9, 2023

(30) Foreign Application Priority Data
Mar. 20, 2020 (DE) .................. 10 2020 203 638.1

(51) Int. Cl.
*G02B 27/01* (2006.01)
*G02B 26/10* (2006.01)

(52) U.S. Cl.
CPC ....... *G02B 27/0172* (2013.01); *G02B 26/101* (2013.01); *G02B 2027/0112* (2013.01);
(Continued)

(58) Field of Classification Search
CPC ............. G02B 27/0172; G02B 26/101; G02B 2027/0112; G02B 2027/0123;
(Continued)

(56) References Cited

U.S. PATENT DOCUMENTS

2010/0157400 A1   6/2010  Dimov et al.
2018/0045902 A1*  2/2018  Lee .................... G02B 27/0103
(Continued)

FOREIGN PATENT DOCUMENTS

DE   102016201567 A1   8/2017
DE   102017129039 A1   6/2018
(Continued)

OTHER PUBLICATIONS

International Search Report for PCT/EP2021/052603, Issued Jun. 25, 2021.

*Primary Examiner* — Sing-Wai Wu
*Assistant Examiner* — Khoa Vu
(74) *Attorney, Agent, or Firm* — NORTON ROSE FULBRIGHT US LLP; Gerard A. Messina

(57) ABSTRACT

A projection device for smart glasses. The projection device includes an image generating unit for generating at least one first light beam representing image information, and at least one deflecting element, which is configured to deflect the first light beam in the form of a second light beam representing first image information, and to deflect the first light beam in the form of a third light beam representing second image information, into a first field of vision and/or into a second field of vision of an eye; the second light beam and the third light beam differing with regard to a beam divergence; and the second field of vision and the first field of vision at least overlapping.

18 Claims, 4 Drawing Sheets

(52) U.S. Cl.
CPC ............... *G02B 2027/0123* (2013.01); *G02B 2027/0178* (2013.01)

(58) Field of Classification Search
CPC .... G02B 2027/0178; G02B 2027/0147; G02B 2027/0187
See application file for complete search history.

(56) References Cited

U.S. PATENT DOCUMENTS

| | | | |
|---|---|---|---|
| 2018/0164592 A1* | 6/2018 | Lopes | G02B 27/0172 |
| 2018/0164880 A1* | 6/2018 | Kim | G06V 40/19 |
| 2018/0284451 A1 | 10/2018 | Eash et al. | |
| 2018/0373024 A1* | 12/2018 | Sugawara | G02B 27/0172 |
| 2019/0041648 A1 | 2/2019 | Petersen | |
| 2021/0026141 A1* | 1/2021 | Hayashi | G02B 25/001 |
| 2021/0063756 A1* | 3/2021 | Yonekubo | G02B 27/0176 |
| 2021/0382309 A1* | 12/2021 | Utsugi | G02B 27/0172 |
| 2022/0128819 A1* | 4/2022 | Topliss | G06T 19/006 |

FOREIGN PATENT DOCUMENTS

| | | |
|---|---|---|
| DE | 102017112888 A1 | 12/2018 |
| DE | 102018112888 A1 | 12/2018 |
| EP | 3396435 A1 | 10/2018 |
| JP | 2019537060 A | 12/2019 |
| WO | 2018043625 A1 | 3/2018 |
| WO | 2018057660 A2 | 3/2018 |

* cited by examiner

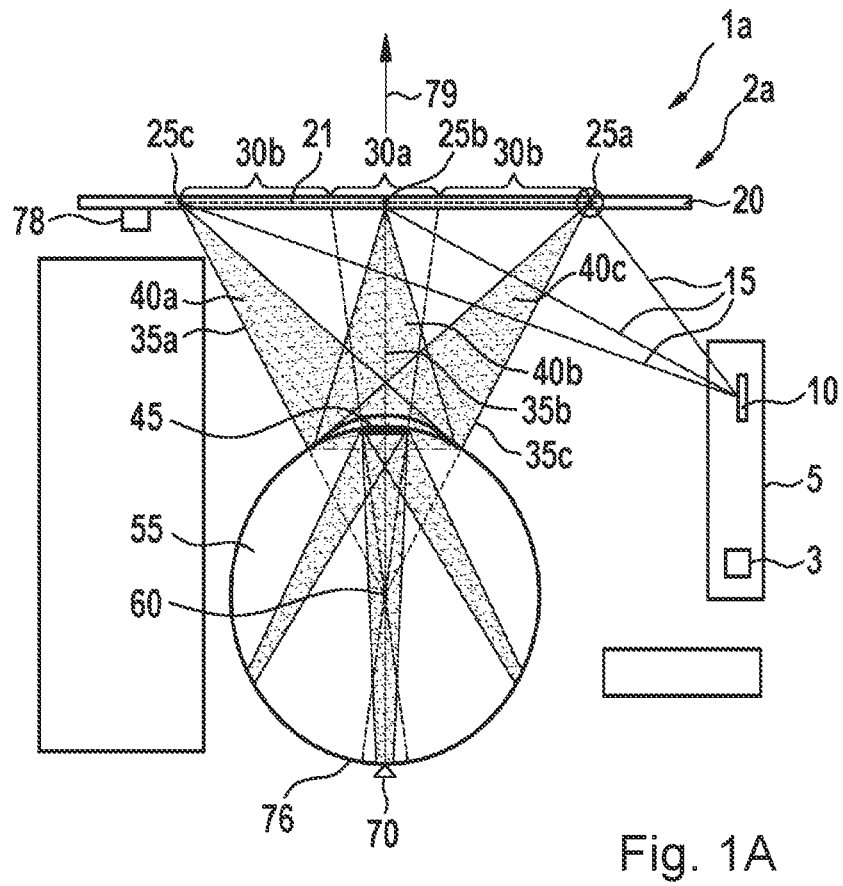
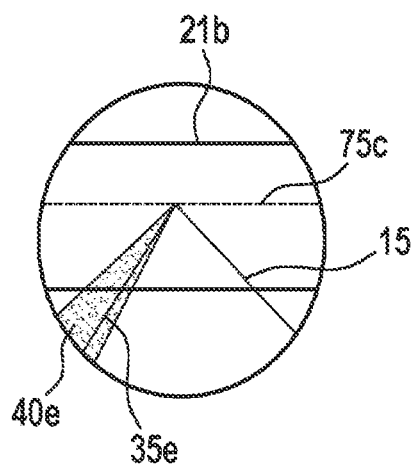 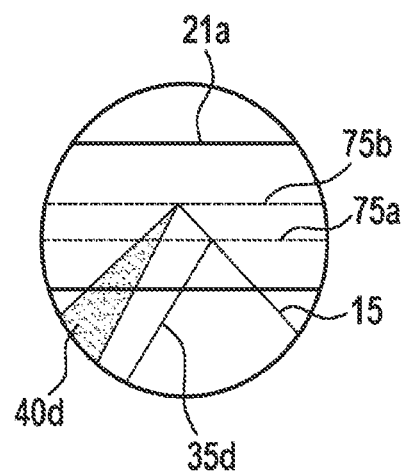
Fig. 1A
Fig. 1B
Fig. 1C

PROJECTION DEVICE FOR SMART GLASSES, METHOD FOR REPRESENTING IMAGE INFORMATION, USING A PROJECTION DEVICE, AND CONTROL UNIT

BACKGROUND INFORMATION

The present invention relates to a device and a method for projection for smart glasses. The subject matter of the present invention also relates to a computer program.

Smart glasses for making information visible in a field of view of a user are available.

SUMMARY

Using the present invention disclosed herein, a projection device for smart glasses, a method for representing image information with the aid of a projection device, in addition, a control unit which utilizes this method, and, finally, a corresponding computer program, are provided. Advantageous further refinements and improvements of the device disclosed herein are rendered possible by the measures disclosed herein.

Advantages attainable by the approach introduced here include that a simple, resource-conserving system design of a projection device for smart glasses, which only includes very few components, is rendered possible. Thus, for example, a markedly simplified holographic function, lower expenditure in the image data processing, as well as sharply reduced tolerance requirements, are rendered possible. In addition, only light beams of just a single wavelength are needed, in particular, for each primary color to be represented.

In accordance with the present invention, a projection device for smart glasses is provided. In accordance with an example embodiment of the present invention, the projection device including the following features:

an image generating unit for generating at least one first light beam that represents image information; and at least one deflecting element, which is configured to deflect the first light beam in the form of a second light beam representing first image information, and to deflect the first light beam in the form of a third light beam representing second image information, into a first field of vision and, additionally or alternatively, into a second field of vision, of an eye; the second light beam and the third light beam differing with regard to a beam divergence; and the second field of vision and the first field of vision at least overlapping.

The different beam divergences of the second light beam and the third light beam advantageously allow as large a surface as possible to be illuminated in the plane of the pupil, using the third light beam, and, consequently, allow the image information to be provided to the eye in a large visual angle range. As a result, there are image sharpnesses of the image information for the eye, which are capable of being perceived differently. For example, the second light beam may have a beam divergence for perceiving a greater image sharpness than the third light beam. In the following, the image information transmitted by the second light beam is referred to as first image information, and the image information transmitted by the third light beam is referred to as second image information. The first image information and the second image information may differ from each other only with regard to a perceptible image sharpness. The deflecting element may preferably be designed in such a manner, that it has different deflecting efficiencies for the second and third light beams. In this manner, in addition to the beam divergences, the second and third light beams may also differ in intensity. Thus, for example, the deflecting efficiency for generating the third light beam for blurred projection may be lower than the deflecting efficiency for generating the second light beam for sharp projection.

In other words, the deflecting element is configured to represent the first image information within the first field of vision and the second field of vision of the eye, using the second light beam, and to represent the second image information within the first field of vision and the second field of vision of the eye, using the third light beam; the light deflected into the first field of vision of the eye and the light deflected into the second field of vision of the eye differing with regard to their beam divergence and, consequently, with regard to the perceptible image sharpnesses, as well as their intensity; and the second field of vision and the first field of vision at least overlapping. In this connection, only light of a single wavelength is needed, in particular, for each primary color to be represented.

According to one specific embodiment of the present invention, the image generating unit may be configured to generate the first light beam. Accordingly, for the projection device of the present invention, only light of a single wavelength is needed, in particular, for each primary color to be represented.

According to a specific example embodiment of the present invention, the projection device includes at least one deflecting element, which is configured to deflect the first light beam in the form of the second light beam and the first light beam in the form of the third light beam into the first field of vision and also into the second field of vision of the eye; the second light beam and the third light beam differing with regard to a beam divergence and, therefore, differing with regard to the perceptible image sharpness, as well as their intensity; and the second field of vision and the first field of vision at least overlapping.

The deflecting element is used for splitting up the first light beam of a single wavelength into a collimated light beam and a divergent light beam.

Smart glasses may be understood as glasses for representing visual information in a field of view of a wearer of the smart glasses. Visual information may be understood, for example, as a pixel or image content. The first or the second image information may represent a monochromatic or color image as a function of the specific embodiment. The two image information items may represent, for example, one and the same image content at different virtual image distances and, consequently, differently perceived image sharpnesses. Thus, for instance, the first image information may be an image perceived as sharp, and the second image information may be an image perceived as blurred. The light beams may be, for example, one laser beam (monochromatic graphic display) or a plurality of laser beams approximately superimposed (polychromatic graphic display). The image sharpness is not to be understood as a physical characteristic of the light beam, but as a result of the distance between the eye of the observer and the distance of the virtual image. In this connection, for instance, the second light beam represents a virtual image at a long distance, while the third light beam may represent an image in the plane of an eyeglass lens. Due to the short distance from the eye, this second image may not be imaged sharply without optical aids, such as contact lenses.

A deflecting element may be understood as an element for deflecting the first light beam and, additionally or alternatively, further first light beams. In particular, the deflecting element may be a hologram, a holographic optical element, or an optionally semireflective mirror. For example, other operating principles are also possible. Thus, for instance, the deflecting element may also be implemented as an optical phased array, electro-optic or magneto-optic deflector, or as arrays of such deflectors. The deflecting element may be integrated, for example, in an eyeglass lens of the smart glasses. Depending on the specific embodiment, the deflecting element may perform at least a first function of deflecting the first light beam in the form of the second light beam, and a second function of deflecting the first light beam in the form of the third light beam. For example, the first function may be understood to be, that the deflecting element splits the first light beam into a first portion of the first light beam, in particular, a collimated portion of the first light beam, in the form of a second light beam, and into a second portion of the first light beam, in particular, a divergent portion of the first light beam, in the form of a third light beam. A field of vision may be understood as a range observable by an eye of the wearer while wearing the smart glasses. The first and second fields of vision may at least overlap or be positioned to be coincident. In particular, for instance, the first field of vision may be a central field of vision of the eye, and the second field of vision may be a peripheral field of vision of the eye.

Each light beam may cover the entire field of vision. In this connection, both the image information of the third light beam perceived as blurred and the image information of the second light beam perceived as sharp may be able to be switched off or dimmed selectively as a function of the direction of view of the user, for example, to adjust the visual impression and/or to conserve energy. The second and/or third light beam is preferably dimmed as a function of the direction of view of the wearer of the smart glasses.

For example, the first light beam may also be a bundle of radiation made up of a plurality of first light beams. The second light beam may equally be a bundle of radiation made up of a plurality of second light beams. In the same way, the third light beam may be a bundle of radiation made up of a plurality of third light beams.

The approach put forward here is based on the knowledge that with the aid of a suitable deflecting element, in particular, e.g., a holographic optical element, smart glasses may project images of differing sharpness into a plurality of fields of vision of an eye of an observer that at least overlap or are positioned to be coincident. In this connection, e.g., by utilizing the physiology of the human eye, the sharp image contents and also the blurred image contents may be represented simultaneously, for example, in a superimposed manner.

This allows a system to be constructed in a resource-conserving manner, using as low a number of components as possible. In the projection device put forward, only light of a single wavelength is needed, in particular, for each primary color to be represented. Thus, for example, a number of required light sources may be reduced to one light source in the case of monochromatic graphic display, and to three light sources in the case of full-color graphic display (RGB). For example, in the case of two primary colors and the secondary colors resulting from them, two light sources may also be sufficient. Consequently, a number of necessary reflective layers, such as hologram layers, may also be reduced in a corresponding manner. At the same time, the approach put forward here allows the implementation of smart glasses having a large field of view and a large effective eyebox. Consequently, the functionality of the smart glasses may be improved.

According to one specific embodiment of the present invention, the deflecting element may be configured to generate the second light beam from the first light beam via deflection, in such a manner, that the first image information has a higher perceived image sharpness than the second image information. The deflecting element may be configured to represent the first image information within a central field of vision of the eye in the form of the first field of vision, and, additionally or alternatively, to represent the second image information within a peripheral field of vision of the eye in the form of the second field of vision. In addition, the deflecting element may be configured to represent the first image information within the peripheral field of vision of the eye in the form of a the second field of vision, and, additionally or alternatively, to represent the second image information within the central field of vision of the eye in the form of the first field of vision. In this connection, the first image information may include an image having a higher image sharpness. The different image sharpness may be achieved, in particular, due to the beam divergence and the associated, virtual image distance, as well as due to the beam diameter and the associated, effective aperture. Thus, using a suitably strong contact lens for extreme farsightedness, the second image information may also be perceived as sharp. A central field of vision may be understood as a range, in which the eye perceives images at a high visual acuity, that is, foveally. A peripheral field of vision may be understood as a range, in which the eye perceives images at a reduced visual acuity, that is, peripherally. For example, the central field of vision may be at least partially surrounded by the peripheral field of vision. In this manner, image information having a high image sharpness may be represented in all of the ranges perceivable by the eye, that is, in those, in which the eye may actually see sharply, and also in those, in which it may see in a blurred manner. Due to this, the efficiency of the projection device may be increased. Consequently, the manufacturing costs of the projection device may be reduced.

The deflecting element may be configured to deflect or represent the first image information within the first field of vision and, additionally or alternatively, within the second field of vision; and, additionally or alternatively, to deflect or represent the second image information within the second field of vision and, additionally or alternatively, within the first field of vision; the second field of vision and the first field of vision being able to positioned so as to be coincident. This allows sharp image content and also blurred image content to be represented simultaneously in, for example, an entire field of view of the eye. Therefore, expensive tracking of certain image contents for particular fields of vision of the eye may be advantageously omitted.

In accordance with an example embodiment of the present invention, the deflecting element may be configured to deflect the first light beam in the form of the second light beam representing the first image information and, additionally or alternatively, to deflect the first light beam in the form of the third light beam representing the second image information, to a point situated in back of a pupil of the eye. As an alternative to this, the deflecting element is further configured to deflect the first light beam in the form of the third light beam representing the second image information, to a point situated in front of the pupil of the eye.

The deflecting element may be configured, for example, to deflect the first light beam in the form of the second light beam representing the first image information and, additionally or alternatively, to deflect the first light beam in the form of the third light beam representing the second image information, to a point, which represents a center of rotation of the eye. Consequently, a particularly large angular width is rendered possible for a particularly large field of view of the eye. Thus, the first image content and/or the second image content also continue to be advantageously visible in the case of large rotations of the eye, such as within an angular range of 60°.

The deflecting element preferably includes a first hologram layer, which is configured to deflect the first light beam in the form of the second light beam representing the first image information, and to deflect the first light beam in the form of the third light beam representing the second image information, into the first field of vision and/or the second field of vision of the eye. Consequently, in this connection, the first hologram layer taking the form of a single holographic optical element (HOE) has at least two different functions. First of all, a portion of the first light beam in the form of a collimated, second light beam is reflected by the first hologram layer in the direction of the eye. To this end, for example, in the image generating unit, in particular, a laser scanning unit, the first light beam is adapted, for example, using one or more focusing lenses at the entrance and/or exit of the laser module, in such a manner, that the first light beam in the form of the second light beam is collimated after reflection by the first hologram layer. The diameter of the collimated, second light beam is markedly smaller than the diameter of the pupil of the eye, which means that a sharp image is formed on the retina substantially independently of the current state of accommodation. In order that the other subsections of the image situated in the peripheral field of view simultaneously become visible, the second functionalization of the first hologram layer is designed in such a manner, that it acts for the first light beam, so that it generates a divergent, third light beam at the location of the eye after reflection. The direction of the third divergent light beam is preferably set for all locations of the second functionalized range in such a manner, that a second outlet pupil is formed in the region of the pupil of the eye. The diameter of the divergent light beam at the location of the pupil of the eye is considerably greater than the diameter of the collimated light beam. In this manner, light of all subsections of the image reaches the retina and results in a blurred image, there.

As an alternative to this, the deflecting element includes a second and third hologram layer; the second hologram layer being situated in a layer different from the third hologram layer. The second hologram layer is configured to deflect the first light beam in the form of the second light beam representing the first image information, into the first field of vision and/or the second field of vision of the eye. The third hologram layer is configured to deflect the first light beam in the form of the third light beam representing the second image information, into the first field of vision and/or the second field of vision of the eye. In this case, as well, a hologram layer may be understood as a holographic optical element implemented as a layer. Such a holographic optical element is configured to reflect only light of a specific wavelength at a selected angle of incidence, in the direction of the eye. A different plane may be understood as a different layer; for example, the second hologram layer and the third hologram layer may be positioned one behind the other, for example, flush, overlapping or staggered. In order to split up the first light beam into the second and third light beams, the efficiency of the second hologram layer may be such, that only a portion of the first light beams are reflected by the second hologram layer in the direction of the eye. In particular, the one portion of the first light beam is reflected by the second hologram layer into the eye in the form of a collimated, second light beam. The remaining portion of the first light beams is transmitted by the second hologram layer and is then subsequently reflected by the third hologram layer in the form of the third light beam. In particular, the portion of the first light beam is reflected by the third hologram layer in the form of a divergent, third light beam.

In addition, in accordance with an example embodiment of the present invention, the projection device preferably includes at least one lens, which is configured to split up the first light beam into the second light beam representing the first image information, and into the third light beam representing the second image information. In particular, the lens is suitable for splitting up the first light beam into a collimated and a divergent portion, in particular, into a core portion and a sheath portion of the first light beam, before the first light beam strikes the deflecting element. The core and sheath portions have different angles of divergence, which are set in such a manner, that after reflection by the deflecting element, a collimated and a divergent portion are formed again. In this connection, the deflecting element preferably takes the form of a hologram layer, in particular, the first hologram layer, which deflects the first light beam in the form of the second light beam representing the first image information, and the first light beam in the form of the third light beam representing the second image information, into the first field of vision and/or the second field of vision of the eye. To split up the first light beam into the collimated and the divergent portion, the lens includes, in particular, at least two regions, in particular, functional regions, different from each other; the at least two regions of the lens different from each other being configured to split up the first light beam into the second light beam representing the first image information and into the third light beam representing the second image information. An example of such a lens is a focusing lens modified to form a 2-zone lens, in which the core and sheath portions of the first light beam pass through regions of, for example, differing focal length as a result of different radii of curvature. As an alternative, however, micropatterning or roughening of one of the two lens zones is also possible. A further alternative is holographic functionalization of the lens surface or complete implementation of the multizone lens function as an HOE.

The deflecting element is preferably formed in such a manner, that in a specific direction of view, in particular, a straight direction of view, of the user, a first luminous flux of the second light beam representing the first image information, in a central field of vision of the eye in the form of the first field of vision, is adjusted, in particular, increased, in comparison with a second luminous flux of the third light beam representing the second image information, in the central field of vision of the eye. The luminous flux is a photometric variable, which indicates how much light perceptible to the human eye a light source radiates per unit time. It corresponds to the physical (radiometric) radiant power, but additionally takes the sensitivity of the human eye into account. It is specified in the unit of measure, lumens (lm). In this connection, the luminous flux may be set, for example, using an established efficiency of the at least one hologram layer of the deflecting element. In summary, the first image information perceived to have a higher image sharpness is projected in the central field of vision of the eye at a higher level of image brightness than the second image information. In addition, the at least one hologram layer of the deflecting element may be configured to increase a third luminous flux of the third light beam representing the second image information, in a peripheral field of vision of the eye, in comparison with a fourth luminous flux of the second light beam representing the first image information, in the peripheral field of vision of the eye. For this, e.g., an above-described hologram layer may be formed differently in the central region, in particular, in a region, which corresponds to a straight direction of view of the wearer of the glasses, in comparison with the regions of the at least one hologram layer that are situated further out. Consequently, a clear, high-contrast image may be visible to a wearer of glasses, who looks straight ahead, in the central field of vision, as well as in the peripheral field of vision.

As an alternative to this, the deflecting element is configured to increase a fifth luminous flux of the second light beam representing the first image information, in comparison with a sixth luminous flux of the third light beam representing the second image information, in the central field of vision and in the peripheral field of vision. In this connection, the image generating unit is preferably configured to increase a seventh luminous flux of the first light beams in the peripheral field of vision in comparison with an eighth luminous flux of the first light beams in the central field of vision of the eye. For this, the image generating unit, in particular, the laser scanning unit, may use a higher laser power, for example, in a field of vision, which corresponds to the peripheral field of vision of the user, than in the field of vision, which corresponds to the central field of vision of the user. Using this measure, the above-described reduction in the image brightness of the third image information is compensated for in the peripheral field of vision. In addition, the effect of a blurred optical image of a self-illuminating object, which results in a lower luminous density of the image than a sharp optical image of the same object, is also compensated for, since the light emitted by the object is distributed over a larger surface in the case of a blurred image. The effect is particularly large in the case of images containing few bright and many black pixels (e.g., white text on black background).

According to an example embodiment of the present invention, the projection device preferably includes, in addition, a direction-of-view detection unit for ascertaining a direction of view of the eye. In particular, the direction-of-view detection unit is configured to ascertain the direction of view, using a laser. In addition, the direction-of-view detection unit is configured, in particular, to ascertain the direction of view, using an infrared light, whose wavelength preferably lies in the range of 750 nm to 1500 nm. In connection with the function of the image generating unit described in the paragraph above, such a direction-of-view detection unit has the advantage of adjusting the seventh and eighth luminous fluxes as a function of the ascertained direction of view. Consequently, the system may no longer be optimized for only one direction of view of the user, but may be adjusted to different directions of view of the wearer of the glasses.

According to a further specific embodiment of the present invention, the projection device may include an eyeglass lens. In this connection, the deflecting element may be implemented as part of the eyeglass lens. In particular, the deflecting element may be cast integrally into the eyeglass lens and, additionally or alternatively, laminated in and, additionally or alternatively, applied to the eyeglass lens and, additionally or alternatively, imprinted. An eyeglass lens may be understood as, for example, a disk or lens made of glass or plastic. Depending on the specific embodiment, the eyeglass lens may be shaped in order to correct refractive errors of the eye. This specific embodiment allows particularly simple, inconspicuous, and inexpensive integration of the deflecting element.

In this connection, the deflecting element may extend over at least a major portion of a surface of the eyeglass lens. This allows the deflecting element to cover as large an area as possible of a field of view of the eye.

In addition, the image generating unit may be configured to generate the first light beam in such a manner, that the first image information and, additionally or alternatively, the second image information represents an at least two-color, in particular, multicolor image. In this manner, the display quality of the projection device may be improved.

The approach put forward here further provides a method for representing image information with the aid of a projection device according to one of the above-mentioned specific embodiments of the present invention. In accordance with an example embodiment of the present invention, the method includes the following steps:

generating at least the first light beam; and
deflecting, in particular, proportionally deflecting, the first light beam in the form of the second light beam representing the first image information, and additionally deflecting, in particular, proportionally deflecting, the first light beam in the form of the third light beam representing the second image information, into the first field of vision and, additionally or alternatively, into the second field of vision of the eye; the first light beam being deflected in such a manner, that the second light beam and the third light beam differ with regard to a beam divergence; and the second field of vision and the first field of vision at least overlapping.

In the deflecting step, the second light beam may be deflected, in order to represent the first image information within the first field of vision and the second field of vision, and additionally or alternatively, the third light beam may be deflected, in order to represent the second image information within the second field of vision and the first field of vision.

Prior to the deflecting step, the method may include a diffracting step, in which at least the first light beam is diffracted. Thus, in the diffracting step, the first light beam generated, for example, by a permanently installed light generating unit may be diffracted, for example, by a movable micromirror or a spatial light modulator, such as a DMD or LCoS, onto a deflecting element, before it/they are then deflected, for example, by the stationary deflecting element into the fields of view.

This method may be implemented, for example, as software or hardware or as a mixture of software and hardware, in, for example, a control unit.

The present invention also provides a control unit, which is configured to perform, control and/or implement, in corresponding devices, the steps of a variant of a method put forward here. The object of the present invention may also be achieved quickly and efficiently by this embodiment variant of the present invention in the form of a control unit.

To this end, the control unit may include at least one processing unit for processing signals or data, at least one storage unit for storing signals or data, at least one interface to a sensor or to an actuator for reading in sensor signals from the sensor or for outputting control signals to the actuator, and/or at least one communications interface for reading in or outputting data, which are embedded in a communications protocol. The processing unit may be, for example, a signal processor, a microcontroller or the like;

the storage unit being able to be a flash memory, an EPROM or a magnetic storage unit. The communications interface may be configured to read in or output data wirelessly and/or by wire; a communications interface, which is able to read in or output the data transmitted by wire, being able to read in these data, e.g., electrically or optically, from a corresponding data transmission line or to output them to a corresponding data transmission line.

In the case at hand, a control unit may be understood to be an electrical device, which processes sensor signals and outputs control and/or data signals as a function of them. The control unit may have an interface, which may be implemented as hardware and/or software. In a hardware design, the interfaces may be, for example, part of a so-called system ASIC that contains various functions of the control unit. However, it is also possible for the interfaces to be separate, integrated circuits or to be at least partially made up of discrete components. In a software design, the interfaces may be software modules that are present, for example, in a microcontroller, next to other software modules.

Additionally advantageous, is a computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device.

BRIEF DESCRIPTION OF THE DRAWINGS

Exemplary embodiments of the present invention are represented in the figures and explained in greater detail in the following description.

FIG. 1A schematically shows a first specific embodiment of a projection device for smart glasses, according to the present invention.

FIG. 1B schematically shows a first specific embodiment of a deflecting element of the projection device for the smart glasses, according to the present invention.

FIG. 1C schematically shows a second specific embodiment of the deflecting element of the projection device for the smart glasses, according to the present invention.

DETAILED DESCRIPTION OF EXAMPLE EMBODIMENTS

Figure 2A:
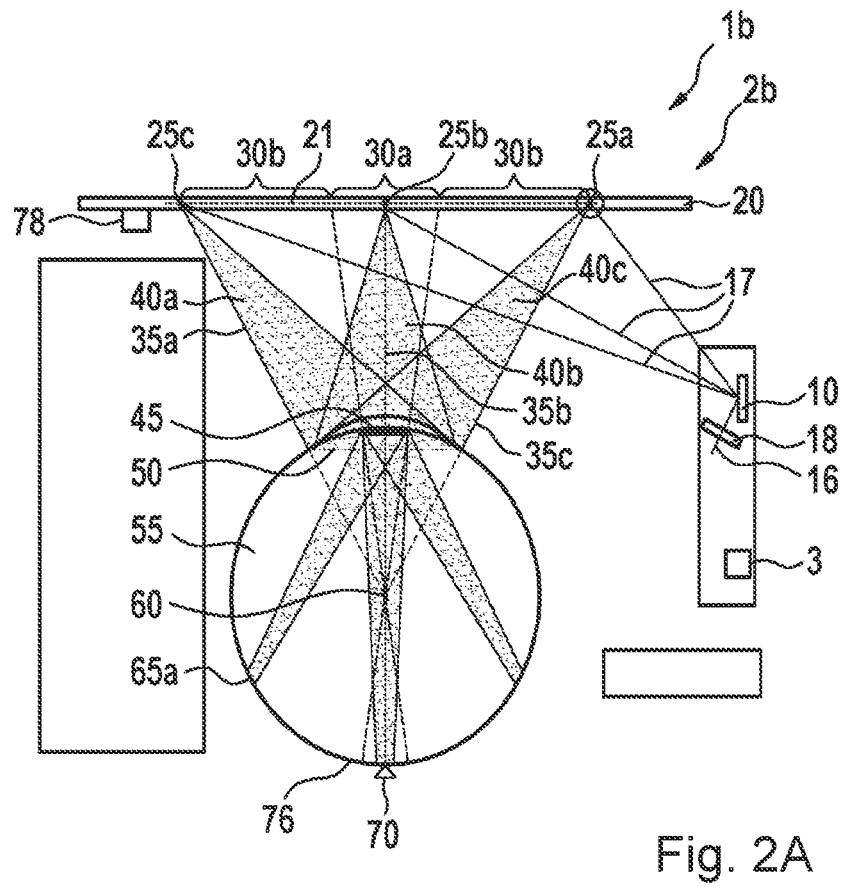
FIG. 2A schematically shows a second specific embodiment of the projection device for the smart glasses, according to the present invention.

FIG. 1A shows a schematic representation of smart glasses 1a having a projection device 2a, according to a first exemplary embodiment. Only by way of example, is the projection device 2a according to this exemplary embodiment positioned at least partially in or on smart glasses 1a.

Projection device 2a includes an image generating unit 5 and a deflecting element 21, which, in this case, is integrated in an eyeglass lens 20 of smart glasses 1a by way of example and is, for example, cast integrally into and/or laminated into eyeglass lens 20. According to an alternative exemplary embodiment, deflecting element 21 may be applied to eyeglass lens 20. The eyeglass lens 20 according to this exemplary embodiment is only part of projection device 2a by way of example.

Image generating unit 5 is configured to generate a first light beam 15 representing image information and to guide it into deflecting element 21. In this connection, by way of example, first light beams 15 are shown, which are guided to outer points 25a and 25c of deflecting element 21 and to central point 25b of the deflecting element. To this end, projection device 2a optionally includes a movable or stationary micromirror 10, which is positioned and configured to guide first light beam 15 to deflecting element 21. Deflecting element 21, for example, a hologram layer or a composite of a plurality of hologram layers, is configured to deflect the first light beam 15 in the form of a second light beam 35a, 35b, and 35c representing first image information, and to deflect the first light beam 15 in the form of a third light beam 40a, 40b, and 40c representing second image information, into a first field of vision 30a and/or a second field of vision 30b of eye 55; second light beam 35a, 35b, and 35c and third light beam 40a, 40b and 40c differing with regard to a beam divergence; and second field of vision 30b and first field of vision 30a at least overlapping. According to this exemplary embodiment, the first and the second image information differ with regard to the perceptible image sharpness; the two image information items being able to represent one and the same image content. According to this exemplary embodiment, deflecting element 21 is configured to deflect second light beam 35a, 35b, and 35c into first field of vision 30a of eye 55 and third light beam 40a, 40b and 40c into second field of vision 30b and first field of vision 30a of eye 55. In general, the two fields of vision 30a, 30b are completely coincident, that is, the two fields of vision 30a and 30b cover the entire field of view, that is, eyeglass lens 20. According to an exemplary embodiment, deflecting element 21 extends over a large part of a surface of eyeglass lens 20, in order to cover as large a region as possible of a field of view of eye 55. For example, first field of vision 30a is a central field of vision, within which eye 55 may perceive images at a high visual acuity, and second field of vision 30b is a peripheral field of vision, within which eye 55 may perceive images at only a low visual acuity.

In the exemplary embodiment shown, first light beam 15 is deflected by deflecting element 2a in such a manner, that the first image information represented by second light beam 35a, 35b and 35c has a higher perceptible image sharpness than the second image information represented by third light beam 40a, 40b and 40c, which means that the image information having the greatest image sharpness is displayed in the central field of vision in the form of first field of vision 30a, in which eye 55 may actually see keenly. The second image information having the lower image sharpness is displayed in the peripheral field of vision in the form of second field of vision 30b and in the central field of vision in the form of first field of vision 30a.

According to the exemplary embodiment shown in FIG. 1A, smart glasses 1a further include an optional control unit 3 for controlling image generating unit 5 and micromirror 10 and/or deflecting element 21. To this end, control unit 3 transmits a corresponding control signal not shown here, to image generating unit 5; image generating unit 5 being configured to generate at least the first light beam 15, using the control signal. In addition, or as an alternative, control unit 3 may output a control signal to deflecting element 21; deflecting element 21 being configured to generate and/or deflect at least the second light beam 35a, 35b and 3c and/or the third light beam 40a, 40b and 40c, using the control signal.

According to this exemplary embodiment, deflecting element 21 is configured to deflect the first light beam 15 in the form of second light beam 35a, 35b, and 35c, in the form of a collimated, second light beam 35a, 35b, and 35c. A non-divergent or scarcely divergent light beam, for instance, at least one laser beam, is to be understood as a collimated light beam. The diameter of collimated, second light beam 35a, 35b, and 35c is markedly smaller than the diameter of the pupil 45 of the eye, which means that a sharp image is formed on retina 76 substantially independently of the current state of accommodation. In addition, in this connection, deflecting element 21 is configured to deflect the first light beam 15 in the form of third light beam 40a, 40b, and 40c, in the form of a divergent, third light beam 40a, 40b, and 40c. At the location of the pupil 45 of the eye, the diameter of divergent light beam 40a, 40b, and 40c is considerably greater than the diameter of collimated light beam 35a, 35b, and 35c. In this manner, light of all subsections of the image reaches retina 76 and results in a blurred image, there.

According to the exemplary embodiment shown, first light beam 15 is generated by image generating unit 5 in the form of laser beams. According to this exemplary embodiment, image generating unit 5 is further configured to generate first light beam 15 in such a manner, that the first image information and/or the second image information represents an at least two-color, in particular, multicolor, image.

In this exemplary embodiment, as is apparent from FIG. 1A, deflecting element 21 is configured to deflect the first light beam 15 in the form of the second light beam 35a, 35b, and 35c representing the first image information, and to deflect the first light beam 15 in the form of the third light beam 40a, 40b, and 40c representing the second image information, to a center of rotation 60 of eye 55 situated in back of a pupil 45 of eye 55. In this manner, the full field of view, in this case, e.g., 60°, is no longer keenly perceptible, but only a segment of it, in this case, e.g., 16.7°. In return, the size of the visible segment is, however, substantially independent of eye movements of eye 55. As a result, eye 55 may look at the whole field of view up to the edge. Thus, smart glasses 1a may also be referred to as AR smart glasses having a large field of view. In the central field of view, eye 55 is provided sharp image information for each viewing angle. In addition, the remaining area of the field of view is covered with the aid of third light beam 40a, 40b, and 40c, which has the same wavelength as second light beam 35a, 35b, and 35c. This image information written by divergent light is perceived as blurred by eye 55. According to this exemplary embodiment, fovea 70 is situated in the center of the FOV (field of view). Using the collimated light, the FOV for eye 55 is partially visible, in this case, 16.7°. Using the divergent light, the FOV for eye 55 is completely visible, in this case, 60°. Due to this, the laser beams are sufficiently large at the eye 55, and in every position of the eye, pupil 45 lies within the illuminated region.

In the specific embodiment shown, deflecting element 21b includes at least one hologram layer 75. In this connection, as is apparent in FIG. 1B, deflecting element 21b may include a first hologram layer 75c, which is configured to deflect first light beam 15 in the form of the second light beam 35e representing the first image information, and to deflect first light beam 15 in the form of the third light beam 40e representing the second image information, into first field of vision 30a and/or second field of vision 30b of eye 55. In this case, second light beam 35e is the collimated, second light beam, and third light beam 40e is the divergent, third light beam. Consequently, in this connection, the first hologram layer 75c taking the form of a single holographic optical element (HOE) has two different functions. First of all, a collimated portion of first light beam 15 in the form of second light beam 35e is reflected by first hologram layer 75c in the direction of eye 55. Secondly, first hologram layer 75c has a scattering function, so that a divergent component of first light beam 15 is reflected in the direction of the eye.

As an alternative to this, as shown in FIG. 1C, deflecting element 21a may include a second 75a and third hologram layer 75b; second hologram layer 75a being situated in a layer different from third hologram layer 75b. In this exemplary embodiment, second hologram layer 75a and third hologram layer 75b are positioned one behind the other. Second hologram layer 75a is configured to deflect first light beam 15 in the form of the second light beam 35d representing the first image information, into first field of vision 30a of eye 55. In this case, as well, second light beam 35d is a collimated, second light beam. The efficiency of second hologram layer 75a is set in such a manner, that a portion of first light beam 15 is transmitted by second hologram layer 75a and then subsequently deflected by third hologram layer 75b in the form of the third light beam 40d representing the second image information, into first field of vision 30a and/or second field of vision 30b of eye 55. Third light beam 40d is again a divergent, third light beam.

Figure 3A:
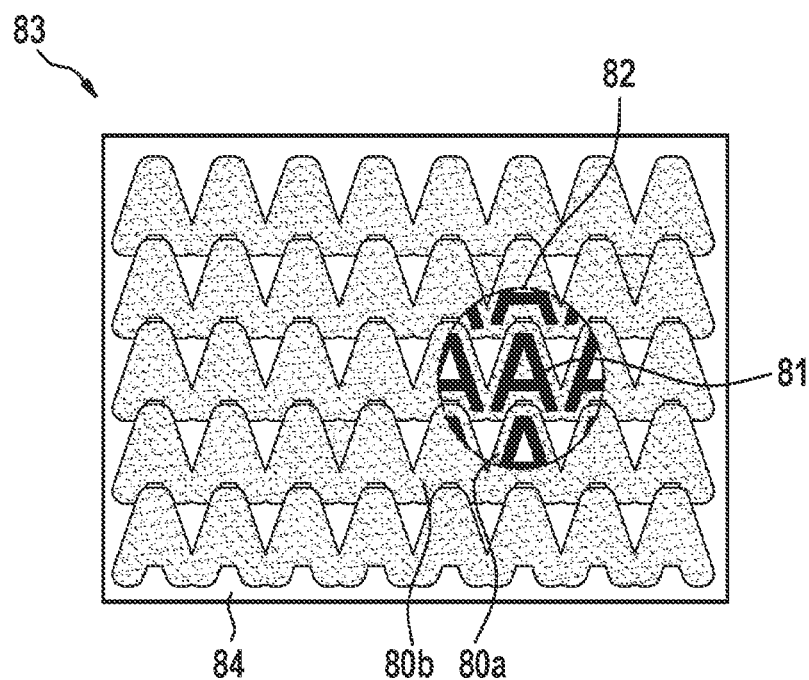
FIG. 3A shows, by way of example, a projected image, which has a higher image sharpness in a first field of vision, according to the present invention.
Figure 3B:
FIG. 3B shows the subjective visual impression of a uniformly perceived image sharpness, which an observer experiences, when the image shown in FIG. 3A is projected onto the retina.

In the central field of vision in the form of first field of vision 30a, collimated, second light beam 35b (high perceived image sharpness) and divergent, third light beam 40b (low perceived image sharpness) are superposed. In this connection, FIG. 3A shows, by way of example, an image 83, in which in a subsection 82 of image 83 in central field of vision 30a, such superposition of collimated light beams 81 and divergent light beams 80a occurs on the retina. In this connection, the specific embodiments of a deflecting element 21a and 21b shown in FIGS. 1B and 1C may be configured to increase a first luminous flux of the second light beam 35b representing the first image information, within a central field of vision of eye 55 in the form of a first field of vision, in comparison with a second luminous flux of the third light beam 40b representing the second image information, within central field of vision 30a of eye 55. To this end, the efficiency of hologram layers 75a-75c in, for example, central field of vision 30a may be different from the efficiency of hologram layers 75a-75c in the outer region of hologram layers 75a-75c. In central field of vision 30a, the portion of first light beam 15, which is converted to a collimated, second light beam 35b, is increased. This causes the sharp imaging in central field of vision 30a to be subjectively predominant for the wearer of the glasses. However, as is also apparent from FIG. 3A, in a subsection 84, which corresponds to the peripheral field of vision of the wearer of the smart glasses, image 83 appears blurred to the user, since there, only divergent light beams 80b are projected onto the retina. Now, in order to also represent the image in peripheral field of vision 30b for the user of smart glasses 1a, at a brightness perceived comparably to the image in central field of vision 30a, deflecting element 21a and 21b is additionally configured to increase a third luminous flux of the third light beam 40a and 40c representing the second image information, in a peripheral field of vision 30b of eye 55, in comparison with a fourth luminous flux of the second light beam 35a and 35c representing the first image information, in a peripheral field of vision 30a of eye 55. In this connection, in outer, peripheral field of vision 30b, due to the differently set efficiency of hologram layers 75a-75c, a higher portion of first light beam 15 is converted to a divergent, third light beam 40a and 40c in the outer region. Consequently, in central field of vision 30a, the sharp imaging dominates the visual impression, whereas in peripheral field of vision 30b, the image is represented, using increased illumination with approximately the same brightness, as well. FIG. 3B shows the subjective visual impression of a uniformly perceived image sharpness, which an observer experiences, when the image shown in FIG. 3A is projected onto the retina. Since sharp imaging predominates over the blurred at any eye position in the central field of view, while the unsharpness of the image in the peripheral field of view is perceived as natural. However, this specific embodiment is limited to optimization in a specific direction of view of the wearer of the glasses (in this case, a direction of view 79 in a straight direction).

As an alternative to this specific embodiment, deflecting element 21a and 21b is configured to increase a fifth luminous flux of the second light beam representing the first image information, in comparison with a sixth luminous flux of the third light beam representing the second image information, in the central field of vision and in the peripheral field of vision. In addition, image generating unit 5 is configured to increase a seventh luminous flux of first light beams 15 in peripheral field of vision 30b of eye 55 in comparison with an eighth luminous flux of the first light beams in central field of vision 30a. For this, image generating unit 5 may use a higher laser power in peripheral field of vision 30b of the user than in the field of vision, which corresponds to central field of vision 30a of the user. In order to optimize the represented image in more than only one specific direction of view of the wearer of the glasses, projection device 2a further includes another direction-of-view detection unit 78 for ascertaining a direction of view of eye 55. In this specific embodiment, direction-of-view detection unit 78 is configured to ascertain the direction of view, using a laser. Image generating unit 5 may now adjust the seventh and eight luminous fluxes as a function of the ascertained direction of view.

In comparison with other possible implementation options, the projection device 2a put forward here renders possible a simple, resource-conserving system design (fewer components are necessary), by utilizing the physiology of the human eye (sharp image contents are only displayed, where they may also be perceived). Projection device 2a achieves a reduction in a number of required laser sources from three laser sources to only one laser source in the case of monochromatic graphic display, and from nine laser sources to only three laser sources in the case of colored (RGB) graphic display. Separate beam expansion optics, tracking mechanisms, as well as contact lenses, are also omitted in projection device 2a. In spite of the simple, resource-conserving system design, projection device 2a simultaneously produces a larger FOV and a larger eyebox.

Consequently, one key to the approach put forward here is dividing up the field of view into two regions, the central field of vision, abbreviated as ZSB, having a high visual acuity, and the peripheral field of vision, abbreviated as PSB, having a low visual acuity;
only one single light beam being needed. In this manner, the graphic display is adapted to the physiology of the human eye.

Figure 2B:
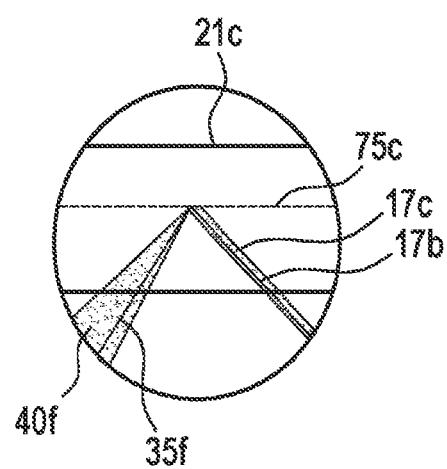
FIG. 2B schematically shows a third specific embodiment of the deflecting element of the projection device for the smart glasses, according to the present invention.
Figure 2C:
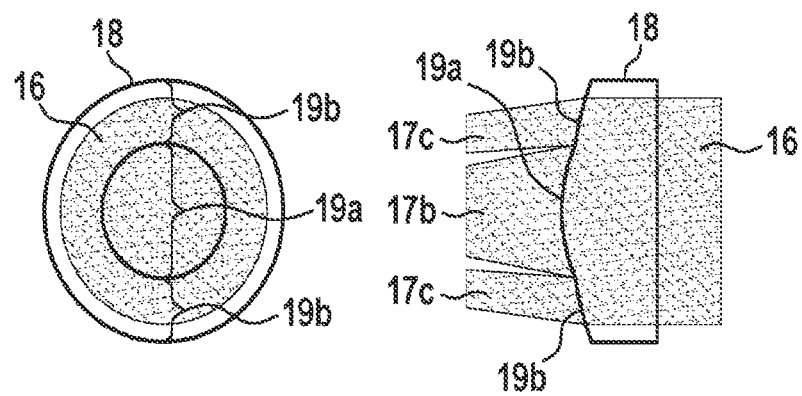
FIG. 2C schematically shows a lens for splitting up the first light beam into the second light beam representing the first image information, and into the third light beam representing the second image information.

FIG. 2A shows a further specific embodiment of a projection device 2b for smart glasses 1b. In this connection, in contrast to first specific embodiment 2a, projection device 2b includes at least one lens 18, which is configured to split up first light beam 16 into second light beam 17b, which is shown in FIG. 2B and represents the first image information, and into the third light beam 17c representing the second image information. Lens 18 splits up first light beam 16 into a collimated 17b and a divergent portion 17c, in particular, into a core portion and a sheath portion of first light beam 16, before first light beam 16 strikes deflecting element 21c. The core and sheath portions have different angles of divergence, which are set in such a manner, that after reflection by deflecting element 21c, a collimated 35f and a divergent portion 40f are formed again. To split up the first light beam into the collimated 17b and the divergent portion 17c, as shown in FIG. 2C, lens 18 includes, in particular, at least two regions 19a and 19b, in particular, functional regions, different from each other; the at least two regions 19a and 19b of lens 18 different from each other being configured to split up first light beam 16 into the second light beam 17b representing the first image information, and into the third light beam 17c representing the second image information. In this exemplary embodiment, lens 18 takes the form of a focusing lens modified to form a 2-zone lens, in which the core and sheath portions of first light beam 16 pass through regions of, for example, differing focal length as a result of different radii of curvature of lens 18.

Figure 4:
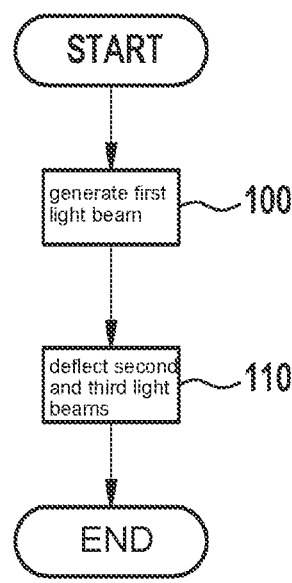
FIG. 4 shows a method for representing image information with the aid of a projection device.

FIG. 4 shows, in the form of a flow chart, a method for representing image information with the aid of a projection device. In this connection, at least one first light beam is generated in a first method step 100. In a following method step 110, the first light beam in the form of a second light beam representing the first image information, and in the form of the third light beam representing the second image information, is deflected into a first field of vision and/or a second field of vision of the eye. In this connection, the first light beam is deflected in such a manner, that the second light beam and the third light beam differ with regard to a beam divergence. The second field of vision and the first field of vision at least overlap. After that, the method is ended.

What is claimed is:

1. A projection device for smart glasses, comprising:
an image generating unit configured to generate at least one first light beam representing image information; and
at least one deflecting element configured to deflect the first light beam in the form of a second light beam representing first image information, and to deflect the first light beam in the form of a third light beam representing second image information, into a first field of vision of an eye and/or a second field of vision of the eye;
wherein the second light beam and the third light beam differ from one another with regard to a beam divergence,
wherein the second field of vision and the first field of vision at least overlapping, and
wherein the deflecting element includes a first hologram layer to deflect the first light beam in the form of the second light beam representing the first image information, and to deflect the first light beam in the form of the third light beam representing the second image information, into the first field of vision of the eye and/or the second field of vision of the eye.

2. The projection device as recited in claim 1, wherein the deflecting element is configured to deflect the first image information into the first field of vision and/or the second field of vision, and to deflect the second image information into the first field of vision and/or second field of vision, the second field of vision and the first field of vision being positioned so as to be coincident.

3. The projection device as recited in claim 1, wherein the first image information has a higher perceived image sharpness than the second image information; the deflecting element being configured to represent the first image information and/or the second image information within a central field of vision of the eye in the form of the first field of vision, and/or within a peripheral field of vision of the eye in the form of the second field of vision.

4. The projection device as recited in claim 1, wherein the deflecting element is configured to deflect the first light beam in the form of the second light beam representing the first image information, to a point situated behind a pupil of the eye, and/or to deflect the first light beam in the form of the third light beam representing the second image information, to a point situated in front of or in back of the pupil of the eye.

5. The projection device as recited in claim 4, wherein the deflecting element is configured to deflect the first light beam in the form of the second light beam and/or the first light beam in the form of the third light beam, to the point, which represents a center of rotation of the eye.

6. The projection device as recited in claim 1, wherein the deflecting element includes a second and third hologram layer, the second hologram layer being situated in a layer different from the third hologram layer, the second hologram layer being configured to deflect the first light beam in the form of the second light beam representing the first image information, into the first field of vision of the eye and/or the second field of vision of the eye, and the third hologram layer being configured to deflect the first light beam in the form of the third light beam representing the second image information, into the first field of vision of the eye and/or the second field of vision of the eye.

7. The projection device as recited in claim 1, wherein the projection device additionally includes at least one lens, the lens being configured split up the first light beam into the second light beam representing the first image information, and into the third light beam representing the second image information.

8. The projection device as recited in claim 1, wherein in the case of a specific direction of view, the deflecting element is configured to increase and/or decrease, a first luminous flux of the second light beam representing the first image information, within a central field of vision of the eye in the form of a first field of vision, in comparison with a second luminous flux of the third light beam representing the second image information, within the central field of vision of the eye.

9. The projection device as recited in claim 8, wherein the deflecting element is configured to adjust a third luminous flux of the third light beam representing the second image information, in a peripheral field of vision of the eye, with respect to a fourth luminous flux of the second light beam representing the first image information, in a peripheral field of vision of the eye.

10. The projection device as recited in claim 9, wherein the deflecting element is configured to increase and/or decrease a fifth luminous flux of the second light beam representing the first image information, in comparison with a sixth luminous flux of the third light beam representing the second image information, in the central field of vision and in the peripheral field of vision.

11. The projection device as recited in claim 10, wherein the image generating unit is configured to increase a seventh luminous flux of first light beams in the peripheral field of vision of the eye, in comparison with an eighth luminous flux of the first light beams in the central field of vision.

12. The projection device as recited in claim 1, wherein the projection device additionally includes a direction-of-view detection unit configured to ascertain a direction of view of the eye.

13. The projection device as recited in claim 1, wherein the projection device includes an eyeglass lens, the deflecting element being implemented as a part of the eyeglass lens, cast integrally and/or laminated in and/or applied to the eyeglass lens.

14. The projection device as recited in claim 13, wherein the deflecting element extends over at least a major portion of a surface of the eyeglass lens.

15. The projection device as recited in claim 1, wherein the image generating unit is configured to generate the first light beam so that the first image information and/or the second image information represents an at least two-color multicolor image.

16. A method for representing image information a projection device, the method comprising:
   generating at least one first light beam; and
   deflecting, via a deflecting element, the first light beam in the form of a second light beam representing first image information, and the first light beam in the form of a third light beam representing the second image information, into a first field of vision of an eye and/or a second field of vision of the eye, the first light beam being deflected so that the second light beam and the third light beam differ with regard to a beam divergence, and the second field of vision and the first field of vision at least overlapping;
   wherein the deflecting element includes a first hologram layer to deflect the first light beam in the form of the second light beam representing the first image information, and to deflect the first light beam in the form of the third light beam representing the second image information, into the first field of vision of the eye and/or the second field of vision of the eye.

17. A control apparatus to represent image information with a projection device, comprising:
   a control unit configured to perform the following:
      generating at least one first light beam; and
      deflecting, via a deflecting element, the first light beam in the form of a second light beam representing first image information, and the first light beam in the form of a third light beam representing the second image information, into a first field of vision of an eye and/or a second field of vision of the eye, the first light beam being deflected so that the second light beam and the third light beam differ with regard to a beam divergence, and the second field of vision and the first field of vision at least overlapping;
      wherein the deflecting element includes a first hologram layer to deflect the first light beam in the form of the second light beam representing the first image information, and to deflect the first light beam in the form of the third light beam representing the second image information, into the first field of vision of the eye and/or the second field of vision of the eye.

18. A non-transitory machine-readable storage medium, on which is stored a computer program, which is executable by a processor, comprising:
- a program code arrangement having program code for representing image information with a projection device, by performing the following:
  - generating at least one first light beam; and
  - deflecting, via a deflecting element, the first light beam in the form of a second light beam representing first image information, and the first light beam in the form of a third light beam representing the second image information, into a first field of vision of an eye and/or a second field of vision of the eye, the first light beam being deflected so that the second light beam and the third light beam differ with regard to a beam divergence, and the second field of vision and the first field of vision at least overlapping;
  - wherein the deflecting element includes a first hologram layer to deflect the first light beam in the form of the second light beam representing the first image information, and to deflect the first light beam in the form of the third light beam representing the second image information, into the first field of vision of the eye and/or the second field of vision of the eye.

* * * * *